(12) United States Patent
Nguyen

(10) Patent No.: US 8,150,028 B2
(45) Date of Patent: Apr. 3, 2012

(54) CIRCUIT DEVICE WITH SERIAL BUS ISOLATION

(75) Inventor: Long Nguyen, Pflugerville, TX (US)

(73) Assignee: Silicon Laboratories, Inc., Austin, TX (US)

(*) Notice: Subject to any disclaimer, the term of this patent is extended or adjusted under 35 U.S.C. 154(b) by 638 days.

(21) Appl. No.: 12/336,835

(22) Filed: Dec. 17, 2008

(65) Prior Publication Data

US 2010/0150338 A1    Jun. 17, 2010

(51) Int. Cl.
*H04M 1/00* (2006.01)
*H01C 7/12* (2006.01)

(52) U.S. Cl. .................................. 379/412; 361/119

(58) Field of Classification Search .................. None
See application file for complete search history.

(56) References Cited

U.S. PATENT DOCUMENTS

| | | | |
|---|---|---|---|
| 4,715,058 A | 12/1987 | Lechner et al. | 379/27 |
| 4,817,092 A | 3/1989 | Denny | 371/11 |
| 4,905,227 A | 2/1990 | Lechner et al. | 370/67 |
| 5,896,443 A | 4/1999 | Dichter | 379/93.08 |
| 5,937,342 A | 8/1999 | Kline | 455/402 |
| 6,104,794 A | 8/2000 | Hein et al. | 379/142 |
| 6,160,885 A | 12/2000 | Scott et al. | 379/399 |
| 6,201,865 B1 | 3/2001 | Dupuis et al. | 379/393 |
| 6,385,235 B1 | 5/2002 | Scott et al. | 375/220 |
| 6,456,712 B1 | 9/2002 | Hein et al. | 379/399.01 |
| 6,654,409 B1 | 11/2003 | Scott et al. | 375/220 |
| 6,744,888 B1* | 6/2004 | El-Kik et al. | 379/412 |
| 6,922,469 B2 | 7/2005 | Scott et al. | 379/399.01 |
| 6,975,723 B2 | 12/2005 | Scott et al. | 379/413.02 |
| 7,046,755 B2 | 5/2006 | Dupuis et al. | 375/377 |
| 7,072,389 B2 | 7/2006 | Scott et al. | 375/220 |
| 7,200,167 B2 | 4/2007 | Scott et al. | 375/220 |
| 7,266,195 B1* | 9/2007 | Dupuis et al. | 379/412 |
| 7,283,584 B2 | 10/2007 | Scott et al. | 375/220 |
| 7,301,995 B2 | 11/2007 | Scott et al. | 375/220 |
| 7,362,841 B2 | 4/2008 | Dupuis et al. | 375/377 |
| 2005/0036604 A1* | 2/2005 | Scott et al. | 379/413 |
| 2008/0018511 A1* | 1/2008 | Leonard et al. | 341/144 |

OTHER PUBLICATIONS

"N.A.T. PMC-860-4S0 Technical Reference Manual," N.A.T. GmbH, Version 1.3.

* cited by examiner

*Primary Examiner* — Fan Tsang
*Assistant Examiner* — Jeffrey Lytle
(74) *Attorney, Agent, or Firm* — Cesari & Reed LLP; R. Michael Reed

(57) ABSTRACT

In a particular embodiment, a circuit device includes a first circuit having a first plurality of serial terminals including a first data receive terminal and a first data transmit terminal. The first plurality of serial terminals is communicatively coupled to a particular circuit via isolation circuitry to communicate first serial data. The circuit device further includes a second circuit having a second plurality of serial terminals including a second data receive terminal coupled to the first data transmit terminal and including a second data transmit terminal coupled to the first data receive terminal to communicate second serial data to the particular circuit via the first data receive and transmit terminals.

18 Claims, 9 Drawing Sheets

CIRCUIT DEVICE WITH SERIAL BUS ISOLATION

FIELD

The present disclosure is generally related to a circuit device with serial bus isolation, and more particularly, but not by limitation to, a subscriber line interface circuit having shared serial bus isolation.

BACKGROUND

Circuit devices often communicate data and control signals via serial buses, which may be bi-directional. In some instances, isolation circuitry may be provided to electrically isolate the circuit devices. One example of a circuit device that uses isolated serial buses to communicate data is a subscriber line interface circuit (SLIC), which can be coupled to communication lines, such as tip and ring lines of a telephone network, to send and receive information via the network communication lines. The SLIC may be adapted to communicate with another circuit via multiple pulse code modulation (PCM) buses and multiple serial peripheral interface (SPI) buses. Each bus typically includes an isolation circuit to electrically isolate the SLIC from the other circuit. Such isolation circuits can include capacitors, transformers, optical isolation circuits, other isolation circuits, or any combination thereof. However, such isolation circuits can increase the overall cost of a device. Hence, there is a need for an improved communication interface between circuit devices.

SUMMARY

In a particular embodiment, a circuit device includes a first circuit having a first plurality of serial terminals including a first data receive terminal and a first data transmit terminal. The first plurality of serial terminals is communicatively coupled to a particular circuit via isolation circuitry to communicate first serial data. The circuit device further includes a second circuit having a second plurality of serial terminals including a second data receive terminal coupled to the first data transmit terminal and including a second data transmit terminal coupled to the first data receive terminal to communicate second serial data to the particular circuit via the first data receive and transmit terminals.

In another particular embodiment, a subscriber line interface circuit (SLIC) device includes a pulse code modulation (PCM) circuit adapted to communicate voice data and a serial peripheral interface (SPI) circuit adapted to communicate control signals to a system. The PCM circuit includes a PCM frame synchronization terminal to receive a PCM frame synchronization signal from the system via a first isolated serial bus and a PCM clock terminal to receive a PCM clock signal from the system via a second isolated serial bus. The PCM circuit further includes a PCM data transmit terminal to transmit PCM data signals to the system via a third isolated serial bus and a PCM data receive terminal to receive PCM data signals from the system via a fourth isolated serial bus. The SPI circuit includes an SPI chip select terminal to receive an SPI chip enable signal to selectively activate the SPI circuit. The SPI circuit further includes an SPI data output terminal coupled to the fourth isolated serial bus and an SPI data input terminal coupled to the third isolated serial bus. The SPI circuit is adapted to communicate SPI data to the system via the third and fourth isolated serial buses.

In still another particular embodiment, a circuit device is disclosed that includes a first circuit having a first plurality of terminals adapted to couple to a respective plurality of serial buses to communicate first serial data via isolation circuitry to a system. The first plurality of terminals includes a first serial data transmit terminal adapted to couple to a first data bus of the respective plurality of data buses, a first serial data receive terminal adapted to couple to a second data bus of the respective plurality of data buses, and a first synchronization terminal adapted to couple to a first synchronization bus of the respective plurality of data buses. The circuit device further includes a second circuit to selectively communicate second serial data via the first serial data receive and transmit terminals in response to receiving the chip select signal. The second circuit includes a second data receive terminal coupled to the first serial data transmit terminal, a second data transmit terminal coupled to the first serial data receive terminal, and a chip select terminal to receive a chip select signal.

DETAILED DESCRIPTION OF ILLUSTRATIVE EMBODIMENTS

In a particular embodiment, a circuit device is disclosed that has two serial communications circuits, such as a pulse code modulated (PCM) circuit and a serial peripheral interface (SPI) circuit. Pins or terminals associated with the two serial communications circuits are interconnected and the bus signals are multiplexed using a frame synchronization signal to communicate first serial data from a first circuit and second serial data from a second circuit via the same isolated serial buses. By multiplexing the bus signals and by interconnecting the pins (or terminals), the number of external serial buses can be reduced, reducing a number of isolation circuits, reducing overall costs, and reducing consumption of circuit real estate. In a particular example, the number of isolation circuits can be reduced from eight to five by interconnecting data buses of the two circuits and by coupling a frame synchronization terminal of the first circuit to a chip select terminal of the second circuit. In another particular example, the number of isolation circuits can be reduced from eight to four by sharing a clock signal, by sharing the data buses, and by utilizing a counter circuit to generate the chip select signal from a frame synchronization signal and a count of the clock signal.

Figure 1:
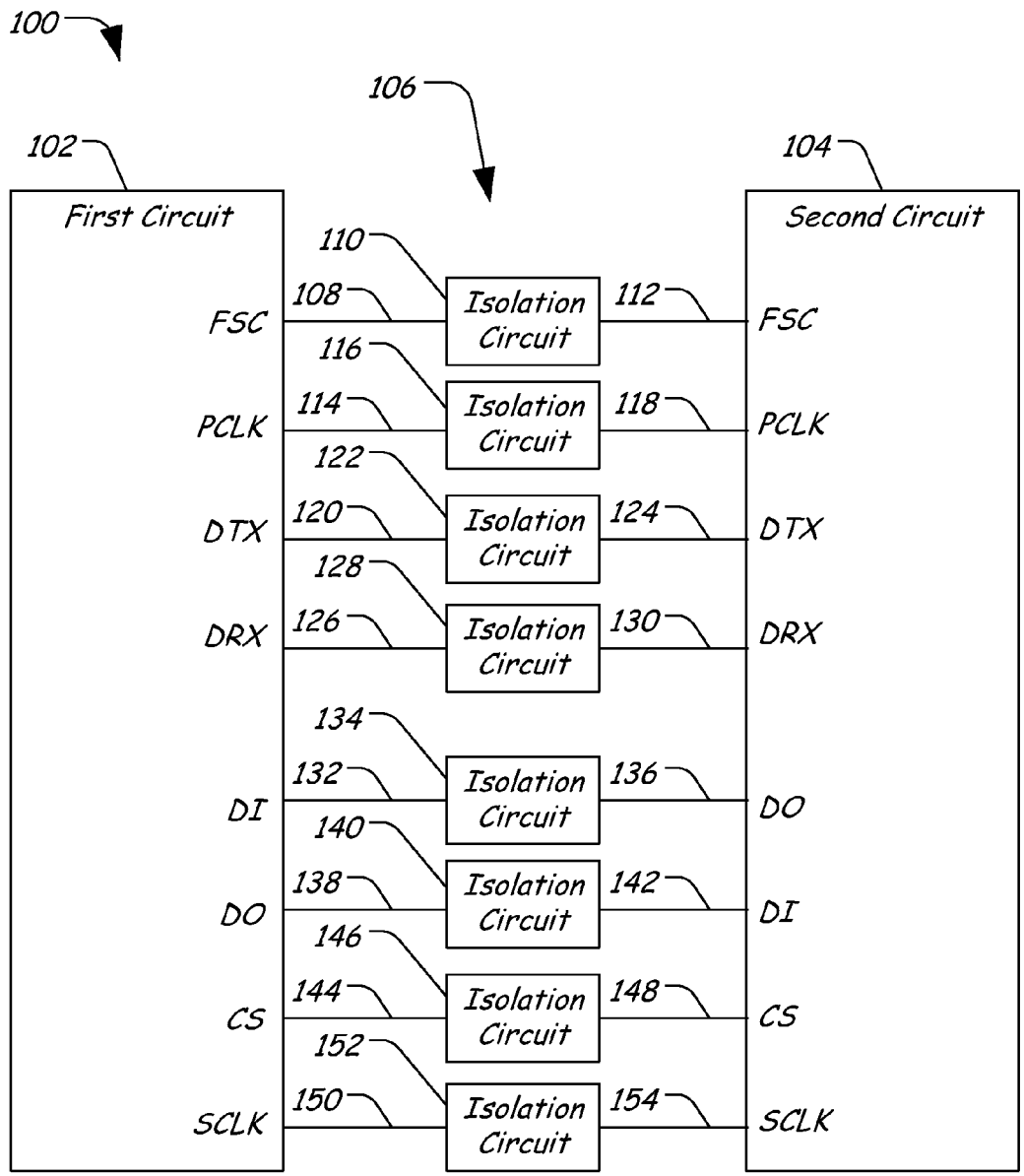
FIG. 1 is a block diagram of a representative embodiment of a circuit device including a first circuit and a second circuit adapted to communicate serial data, such as pulse code modulated (PCM) data and serial peripheral interface (SPI) data via independent isolated serial buses.

FIG. 1 is a block diagram of a representative embodiment of a circuit device 100 including a first circuit 102 and a second circuit 104 that are adapted to communicate serial data, such as pulse code modulated (PCM) voice data samples and serial peripheral interface (SPI) control data via independent, serial buses. Isolation circuitry 106 electrically isolates the first and second circuits 104. In a particular embodiment, the first circuit 102 can be a system on a chip (SoC) and the second circuit 104 can be a subscriber line interface circuit (SLIC), which can be adapted to communicate with a telephone network. As used herein, the term "system on a chip" or "SoC" refers to a circuit device that includes multiple circuit components, such as a processor, a memory, analog circuits, external interfaces, timers, counters, voltage regulators, other circuitry, or any combination thereof on a single silicon chip, enabling the chip to operate as a stand-alone system. Further, as used herein, the term "subscriber line interface circuit" and "SLIC" refers to a circuit that interfaces a device or system to a communications network, such as a telephone network. In another particular embodiment, the first and second circuits 102 and 104 can be adapted to communicate via one or more serial data transfer formats via serial buses. In a particular embodiment, the first and second circuits 102 and 104 communicate via the isolation circuitry 106, which is coupled to the serial buses. While the following discussion assumes that the serial data includes PCM data and SPI data, it should be understood that the first and second circuits 102 and 104 can communicate other types of serial data.

The first circuit 102 includes a first PCM frame synchronization terminal 108 that is coupled to a second PCM frame synchronization terminal 112 of the second circuit 104 via a PCM frame synchronization isolation circuit 110. The first circuit 102 further includes a first PCM clock terminal 114 that is coupled to a second PCM clock terminal 118 of the second circuit 104 via a PCM clock isolation circuit 116. The first circuit 102 also includes a first PCM data transmit terminal 120 that is coupled to a second PCM data transmit terminal 124 of the second circuit 104 via a transmit isolation circuit 122. Additionally, the first circuit 102 includes a first PCM data receive terminal 126 that is coupled to a second PCM data receive terminal 130 of the second circuit 104 via a receive isolation circuit 128.

Additionally, the first circuit 102 includes a first serial peripheral interface (SPI) data input terminal 132 that is coupled to a second SPI data output terminal 136 of the second circuit 104 via an SPI data isolation circuit 134. The first circuit 102 further includes a first SPI data output 138 that is coupled to a second SPI data input 142 of the second circuit 104 via an SPI isolation circuit 140. The first circuit 102 also includes a first SPI chip select terminal 144 coupled to a second SPI chip select terminal 148 of the second circuit 104 via a chip select isolation circuit 146. Additionally, the first circuit 102 includes a first SPI clock terminal 150 that is coupled to a second SPI clock terminal 154 of the second circuit 104 via an SPI clock isolation circuit 152.

In the embodiment shown, the first circuit 102 is adapted to communicate with the second circuit 104 via four PCM buses and four SPI buses. The isolation circuitry 106 includes eight isolation circuits, including isolation circuits 110, 116, 122, 128, 134, 140, 146, and 152 to provide isolation for the PCM and SPI buses. However, each isolation circuit consumes circuit area and contributes to the overall cost of the circuit device 100.

Figure 2:
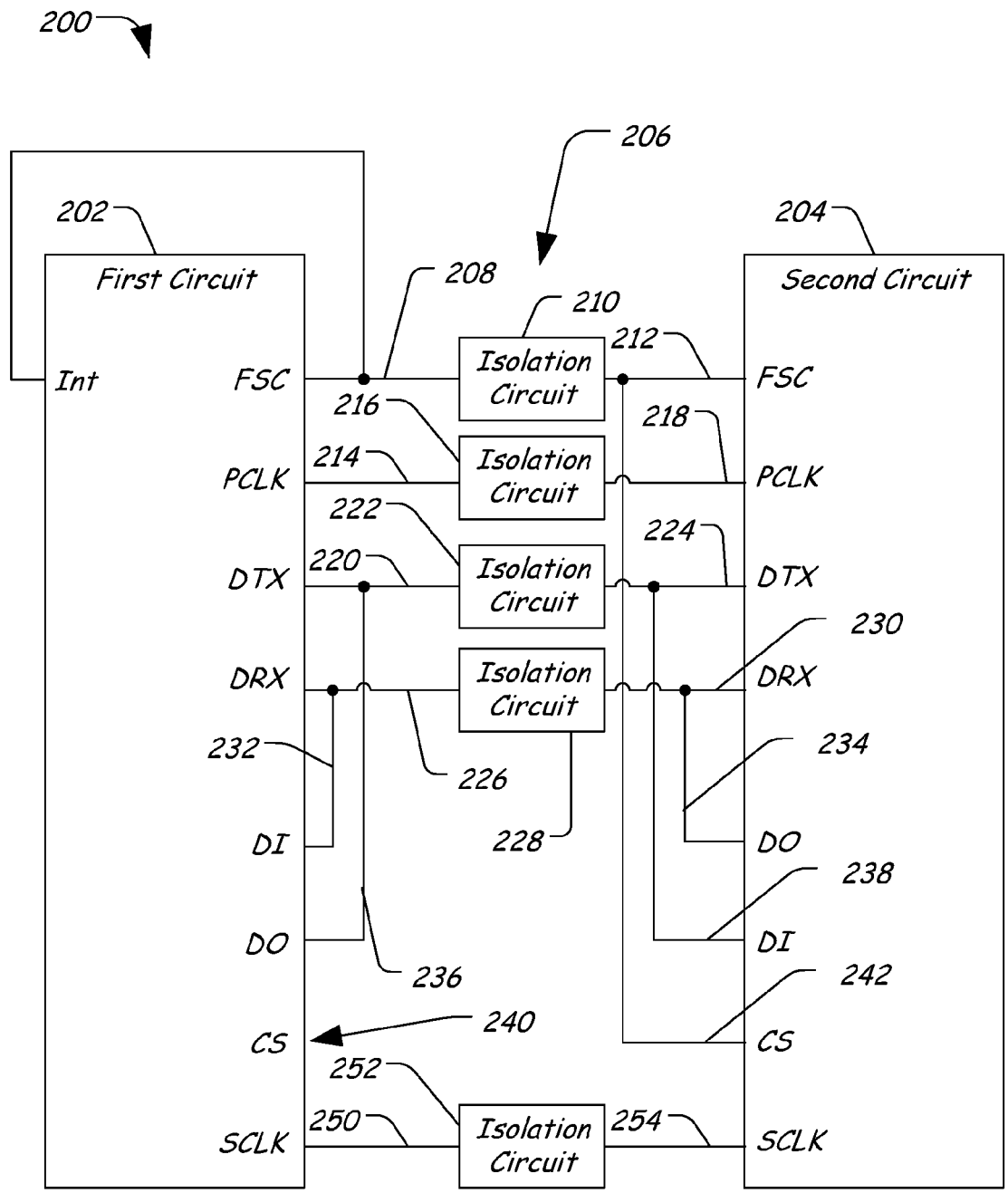
FIG. 2 is a block diagram of a particular illustrative embodiment of a circuit device including a first circuit coupled to a second circuit via multiplexed serial buses having shared isolation circuitry.

FIG. 2 is a block diagram of a particular illustrative embodiment of a circuit device 200 including a first circuit 202 coupled to a second circuit 204 via multiplexed, serial buses having shared isolation circuitry 206. In a particular example, the first circuit 202 can be a system on a chip (SoC) and the second circuit 204 can be a subscriber line interface circuit (SLIC). The first circuit 202 includes a first pulse code modulated (PCM) frame synchronization terminal 208 that is coupled to a second PCM frame synchronization terminal 212 of the second circuit 204 via an isolation circuit 210. The first PCM frame synchronization terminal 208 is also coupled to an interrupt (INT) terminal of the first circuit 202. In a particular embodiment, the interrupt terminal can trigger the first circuit 202 to communicate SPI data to the second circuit 204 based on a value of a PCM frame synchronization signal at the first PCM frame synchronization terminal 208. The first circuit 202 further includes a first PCM clock terminal 214 that is coupled to a second PCM clock terminal 218 of the second circuit 204 via an isolation circuit 216. The first circuit 202 also includes a first PCM data transmit terminal 220 that is coupled to a second PCM data transmit terminal 224 of the second circuit 204 via an isolation circuit 222. Further, the first circuit 202 includes a first PCM data receive terminal 226 that is coupled to a second PCM data receive terminal 230 via an isolation circuit 228. The PCM data transmit terminals 220 and 224 and the PCM data receive terminals 226 and 230 are adapted to communicate PCM voice data samples.

Additionally, the first circuit 202 includes a serial peripheral interface (SPI) data input terminal 232 that is coupled to the first PCM data receive terminal 226. The second circuit 204 includes a corresponding SPI data output terminal 234 that is coupled to the second PCM data receive terminal 230. The first circuit 202 also includes an SPI data output terminal 236 that is coupled to the first PCM data transmit terminal 220, and the second circuit 204 includes a corresponding SPI data input terminal 238 that is coupled to the second PCM data transmission terminal 224. The SPI data input and output terminals 238 and 234 can be used to communicate control data.

The first circuit 202 includes a first chip select terminal 240, which is not coupled to the second circuit 204. In a particular embodiment, the first chip select terminal 240 can be used to provide signals to other circuit components, or the terminal 240 may be omitted. The second circuit 204 includes a second chip select terminal 242 that is coupled to the second PCM frame synchronization terminal 212. In this example, a PCM frame synchronization signal received via the second PCM frame synchronization terminal 242 can be used to control the chip select enable or disable state of a SPI circuit associated with the second circuit 204. The first circuit 202 includes a SPI clock terminal 250 that is coupled to a corresponding SPI clock terminal 254 of the second circuit 204 via a clock isolation circuit.

In a particular embodiment, by multiplexing the SPI data input and output terminals 232 and 236 of the first circuit 202 onto the first PCM receive and transmit terminals 226 and 220, respectively, both PCM and SPI data can be communicated between the first and second circuits 202 and 204 via shared isolation circuits 222 and 228, reducing the number of isolation circuits 206 needed to provide serial bus isolation between the first and second circuits 202 and 204. In a particular example, by reducing the number of isolation circuits 202 and 204, the overall cost to produce the circuit 200 is reduced and the circuit area consumed by the circuit 200 is also reduced. Further, the chip select terminal 240 of the first circuit 202 can be omitted or can be used for other purposes, such as to provide control signals to another circuit device (not shown).

Further, additional isolation circuitry can be omitted by utilizing the frame synchronization signal as a chip select signal. In this instance, the first and second PCM frame synchronization terminals 208 and 212, together with the isolation circuit 210, can be coupled to the second SPI chip select terminal 242, eliminating an isolation circuit that might otherwise be needed to provide chip select isolation. In this particular instance, the rising or falling edge of the PCM frame synchronization signal can be used as a chip select enable signal to selectively initiate communication of the SPI control data.

In a particular embodiment, an SPI clock signal is transmitted from the first circuit 202 to the second circuit 204 via the first SPI clock terminal 250, the isolation circuit 252, and the second SPI clock terminal 254. A PCM clock signal is sent from the first circuit 202 to the second circuit 204 via the first PCM receive and transmit terminals 226 and 220, respectively. The SPI clock signal and the PCM clock signal are sent independently. In this particular instance, the first and second circuits 202 and 204 are either communicating SPI control data or PCM voice data samples via the first and second PCM data transmit and receive terminals 220, 224, 226, and 230, depending on a logic level of the PCM frame synchronization signal.

Figure 3:
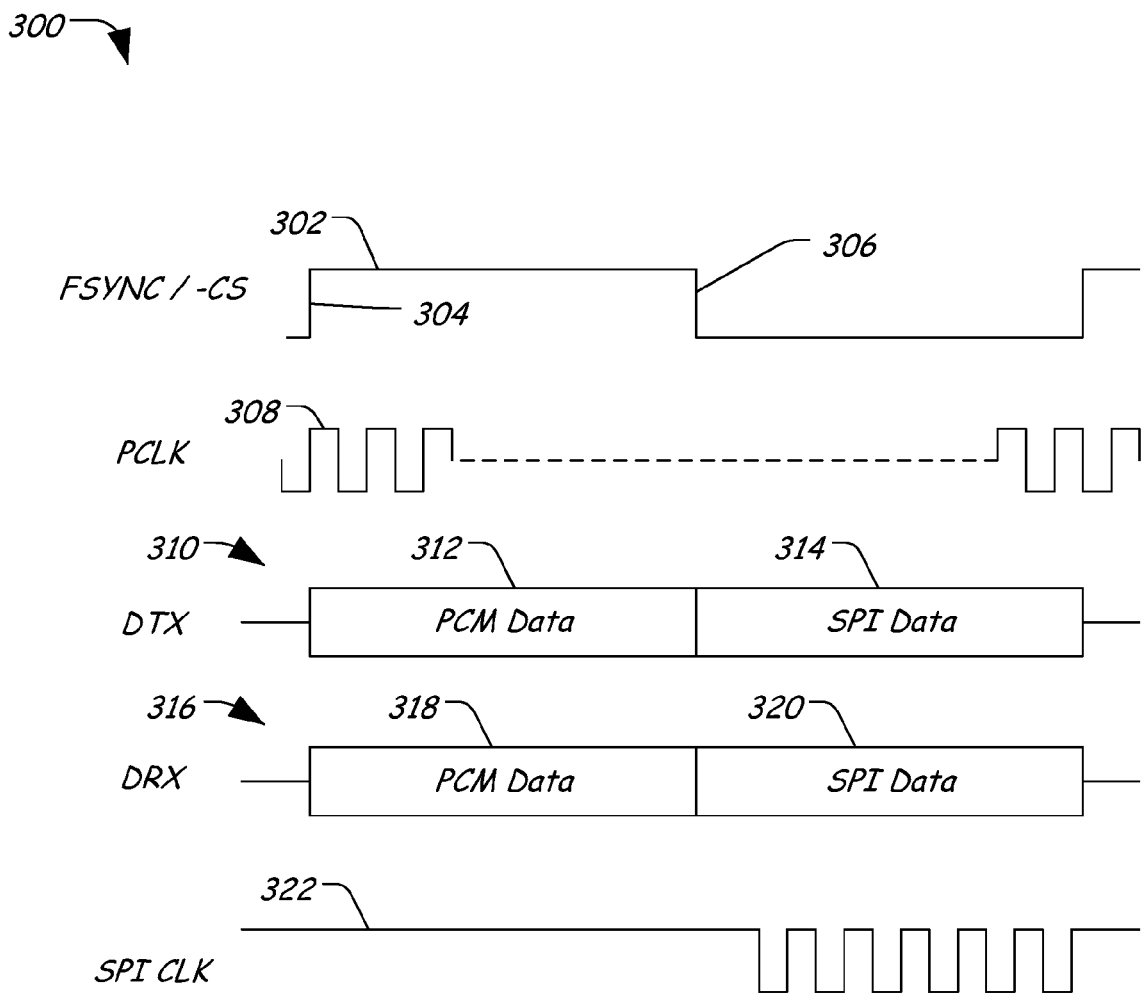
FIG. 3 is a particular illustrative embodiment of a timing diagram for the circuit device of FIG. 2.

FIG. 3 is a particular illustrative embodiment of a timing diagram 300 for the circuit device 200 of FIG. 2. The diagram 300 includes a frame synchronization (FSYNCH)/chip select (CS) signal 302. The diagram 300 also includes a pulse code modulated (PCM) clock signal 308, a data transmit signal 310, a data receive signal 316, and a serial peripheral interface (SPI) clock signal 322. In a particular example, the FSYNCH/CS signal 302 is used to selectively enable communication of PCM voice data samples and SPI control data. At the rising edge 304 of the FSYNCH/CS signal 302, PCM voice data transmission is enabled. The PCM data 312 from the data transmit signal 310 is clocked into a buffer at a second circuit (such as the second circuit 204 illustrated in FIG. 2) according to the PCM clock signal 308. Additionally, PCM data 318 from the data receive signal 316 is received at a first circuit (such as the first circuit 202 illustrated in FIG. 2).

When the FSYNCH/CS signal 302 transitions at a falling edge 306 from a logic high to a logic low level, communication of SPI control data is enabled. In this instance, the SPI clock 322 is used to clock SPI data 314 from the data transmit signal 310 to an SPI buffer at the second circuit and to receive SPI data 320 via the data receive signal 316 at the first circuit. In this particular instance, the logic level of the FSYNCH/CS signal 302 operates as a chip select signal, while the rising and falling edges of the FSYNCH/CS signal 302 operate to synchronize the PCM frame transmissions.

In a particular embodiment, the circuit device may include different frame synchronization modes. In a particular example, when a long frame setting is used, the PCM frame is segmented such that a first portion of the PCM frame (when the FSYNCH/CS signal 302 is at a logic high level) is used to send and receive PCM data 312 and 318 and the second portion of the PCM frame (when the FSYNCH/CS signal 302 is at a logic low level) is used to send and receive SPI data 314 and 320 (or vice versa). By utilizing the PCM data transmit and receive terminals to send and receive both PCM and SPI data, the SPI terminals or pins of the first circuit are not needed to transmit the data. This allows those SPI terminals or pins to be used for other purposes or the pins can be eliminated. Additionally, isolation circuitry for the PCM buses can be shared for both PCM and SPI data transfers, reducing the number of isolation circuits, which reduces overall circuit costs and reduces the overall circuit area consumed.

Figure 4:
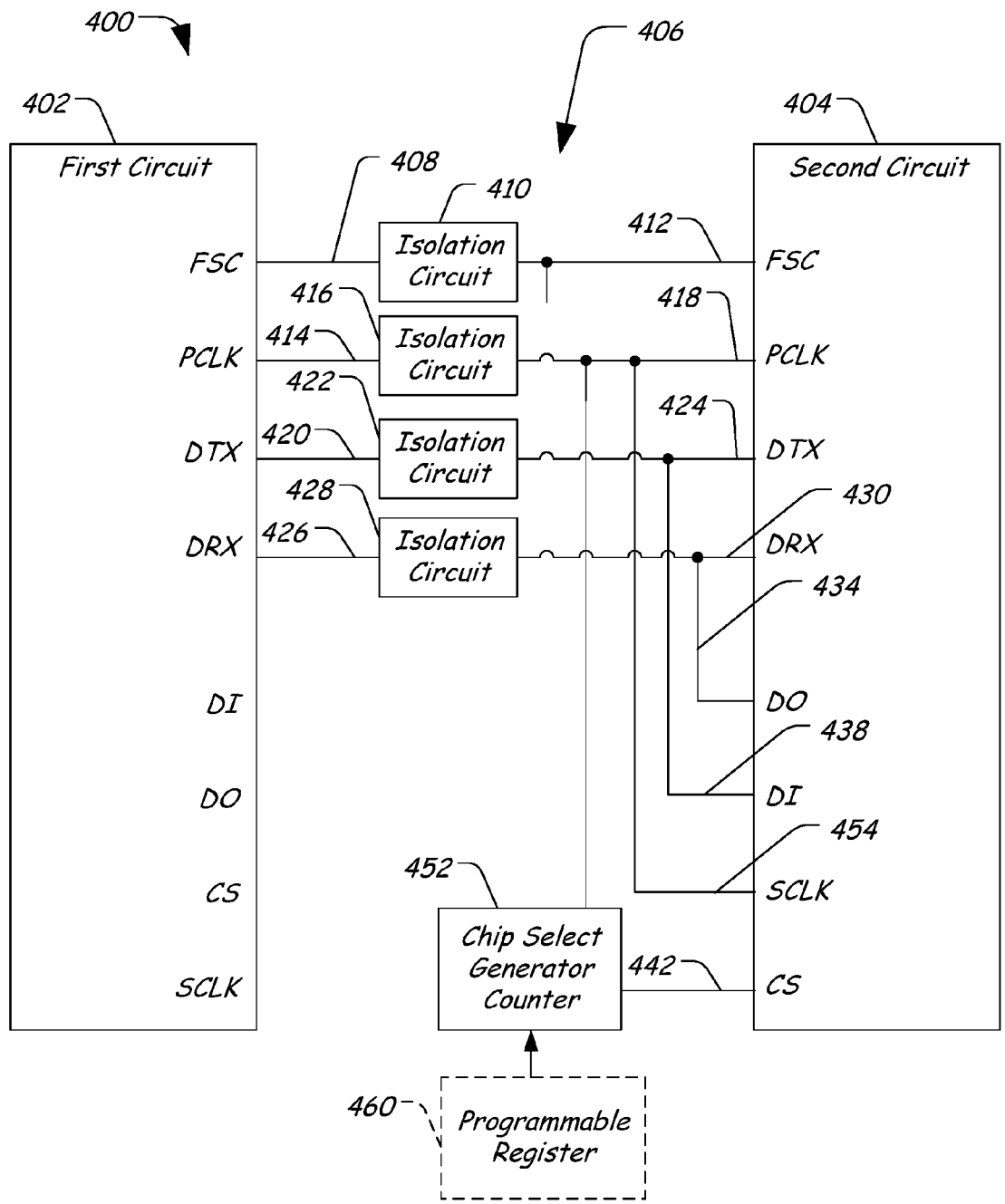
FIG. 4 is a block diagram of a second particular illustrative embodiment of a circuit device including a first circuit coupled to a second circuit via multiplexed serial buses having shared isolation circuitry.

FIG. 4 is a block diagram of a particular illustrative embodiment of a circuit device 400 including a first circuit 402 coupled to a second circuit 404 via multiplexed, serial buses having shared isolation circuitry 406. The first circuit 402 includes a first pulse code modulated (PCM) frame synchronization terminal 408 that is coupled to a second PCM frame synchronization terminal 412 of the second circuit 404 via an isolation circuit 410. The first circuit 402 further includes a first PCM clock terminal 414 that is coupled to a second PCM clock terminal 418 of the second circuit 404 via an isolation circuit 416. The first circuit 402 also includes a first PCM data transmit terminal 420 that is coupled to a second PCM data transmit terminal 424 of the second circuit 404 via an isolation circuit 422. Further, the first circuit 402 includes a first PCM data receive terminal 426 that is coupled to a second PCM data receive circuit 430 via an isolation terminal 428.

The first circuit 402 may also include serial peripheral interface (SPI) terminals (or pins), such as an SPI data input pin, an SPI data output pin, a chip select pin, and an SPI clock pin. In a particular embodiment, the SPI terminals or pins can be repurposed, allowing them to be used to control other circuit operations. In another particular embodiment, the SPI terminals or pins can be omitted from the first circuit 402, reducing the number of pins or terminals and simplifying routing. The first circuit 402 may include a multiplexing circuit feature (not shown) that can be internal to the first circuit 402 to couple SPI data transmit and receive pins to the first PCM data transmit and receive terminals 420 and 426.

The second circuit 404 includes an SPI data output terminal 434 coupled to the second PCM data receive terminal 430. Additionally, the second circuit 404 includes an SPI data input terminal 438 that is coupled to the second PCM data transmit terminal 424. Further, the second circuit 404 includes an SPI clock terminal 454 that is coupled to the second PCM clock terminal 418.

The circuit device 400 includes a chip select (CS) generator counter 452 that is coupled to the second PCM frame synchronization terminal 412 to receive a PCM frame synchronization signal and to the second PCM clock terminal 418 to receive a PCM clock signal and includes an output coupled to a CS terminal 442 of the second circuit 404. The CS generator counter 452 can be used to generate a chip select signal based on at least one of the frame synchronization signal and the PCM clock signal. The CS generator counter 452 is adapted to apply the generated chip select signal to the CS terminal 442. In a particular example, the CS generator counter 452 can be a low cost hardware counter, such as a five-bit counter, to generate a designated chip select time slot within a given PCM frame. In a particular example, the second circuit 404 can be enabled to communicate SPI data via the second PCM data receive and transmit terminals 430 and 424.

In a particular embodiment, by utilizing the PCM clock signal as a clock for both the second PCM clock terminal 418 and the SPI clock terminal 454, the clock isolation circuitry for the SPI clock signal can be eliminated (as compared to the clock isolation circuit 252 of the circuit device 200 illustrated in FIG. 2). Further, in this particular embodiment, the CS generator counter 452 can be utilized to provide more clock-based PCM and SPI signaling based on a count of the PCM clock signal pulses. In this instance, instead of dividing the PCM frame into a first and second portion to carry PCM and SPI data respectively, the CS generator counter 452 can divide the PCM frame according to a PCM pulse count. In a particular embodiment, the CS generator counter 452 may be coupled to a programmable register (such as a programmable register 460), which may be configured to control a PCM pulse count threshold that determines when the CS generator counter 452 enables the SPI circuitry of the second circuit 404. In a particular example, the CS generator counter 452 can enable transmission of SPI control data during a first five PCM clock pulses, and then the CS generator counter 452 can enable transmission of PCM voice data samples, until a next PCM frame synchronization signal is received. In another particular embodiment, the CS generator counter 452 can be a low-cost hardware counter, such as a five-bit counter.

Figure 5:
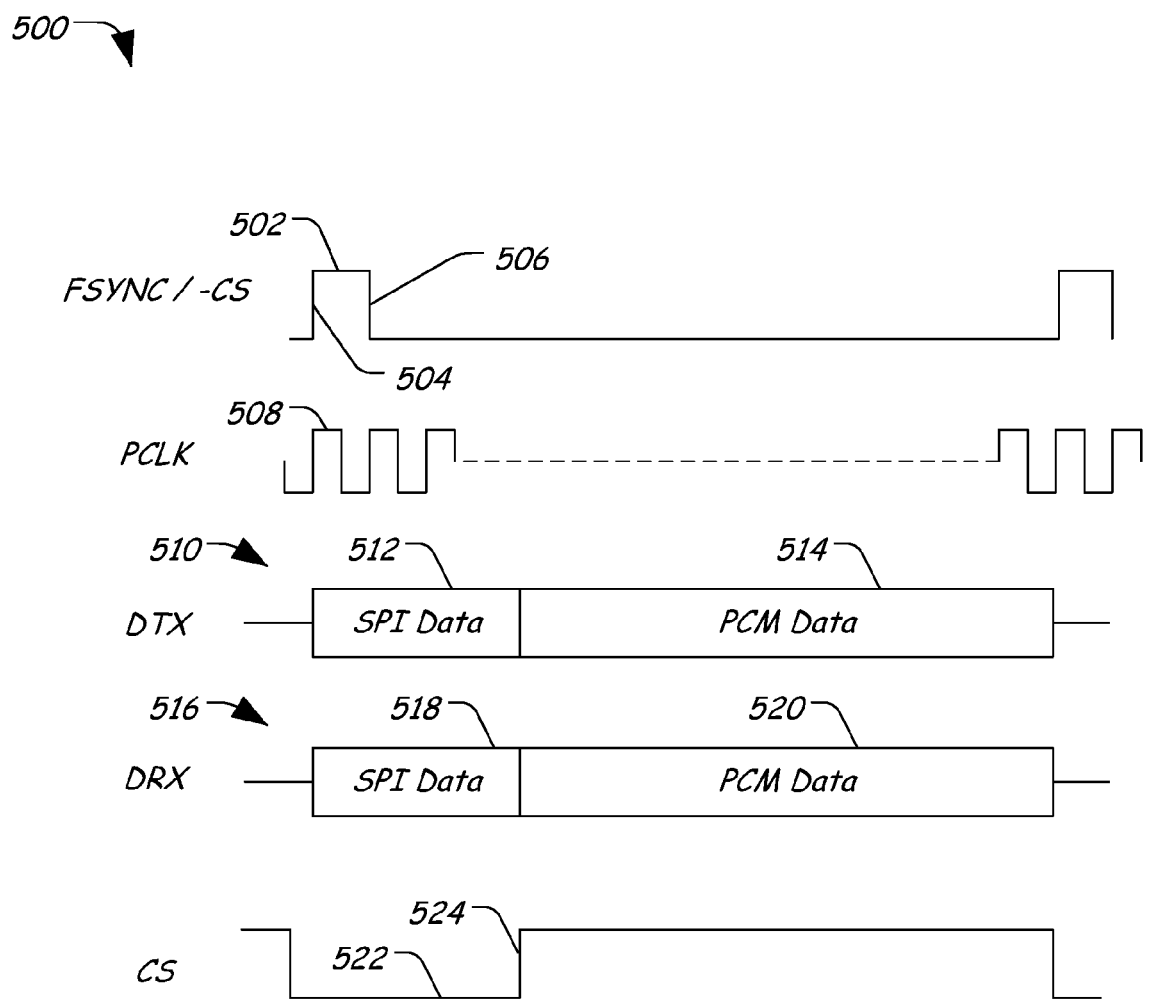
FIG. 5 is a particular illustrative embodiment of a timing diagram for the circuit device of FIG. 4.

FIG. 5 is a particular illustrative embodiment of a timing diagram 500 for the circuit device 400 of FIG. 4. In this particular instance, the PCM and SPI circuits can share the same data terminals and the same clock terminals. Each PCM frame can include designated PCM and SPI time slots. The first circuit can send a NO-OPERATION (NO-OP) command on unused SPI frames.

The diagram 500 includes a frame synchronization (FSYNCH)/chip select (CS) signal 502. The diagram 500 also includes a pulse code modulated (PCM) clock signal 508, a data transmit signal 510, a data receive signal 516, and a chip select signal 522. At the rising edge 504 of the FSYNCH/CS signal 502, SPI data 512 from the data transmit signal 510 can be clocked into a buffer at a second circuit (such as the second circuit 404 illustrated in FIG. 4) according to the PCM clock signal 508. Additionally, SPI PCM data 518 from the data receive signal 516 is received at a first circuit (such as the first circuit 402 illustrated in FIG. 4). The CS generator counter circuit 452 illustrated in FIG. 4 may begin counting pulses of the PCM clock signal 508 in response to the rising edge 504 or falling edge 506 of the PCM frame synchronization pulse 502. After a number of pulses are counted (such as five pulses, 10 pulses, or some other number of pulses), the CS generator counter circuit 452 can adjust a chip select signal 522 to a logic high level. After the chip select signal 522 changes to a logic high level at 524, PCM data 514 and 520 can be sent via the data transmit signal 510 and received via the data receive signal 516, respectively.

In this particular example, the generated chip select signal 522 can reset to a logic low level on an edge of the PCM frame synchronization signal 502, such as the rising edge 504. Further, after the chip select signal 522 is reset, the CS generator counter circuit 452 can count a number pulses of the PCM clock signal 508 and change to a logic high signal level (at 524) when the number of PCM clock pulses is reached. In a particular example, the chip select generator counter circuit can be programmable to adjust the number of pulses to be counted. In a particular embodiment, by sharing the PCM clock signal and multiplexing the SPI and PCM data via the data lines, the number of isolation circuits can be reduced. Further, using a chip select counter generator, the number of isolation circuits can be cut in half (from eight to four). Reducing the number of isolation circuits and reducing the number of serial buses simplifies routing, reduces overall circuit costs, and reduces circuit area usage.

Figure 6:
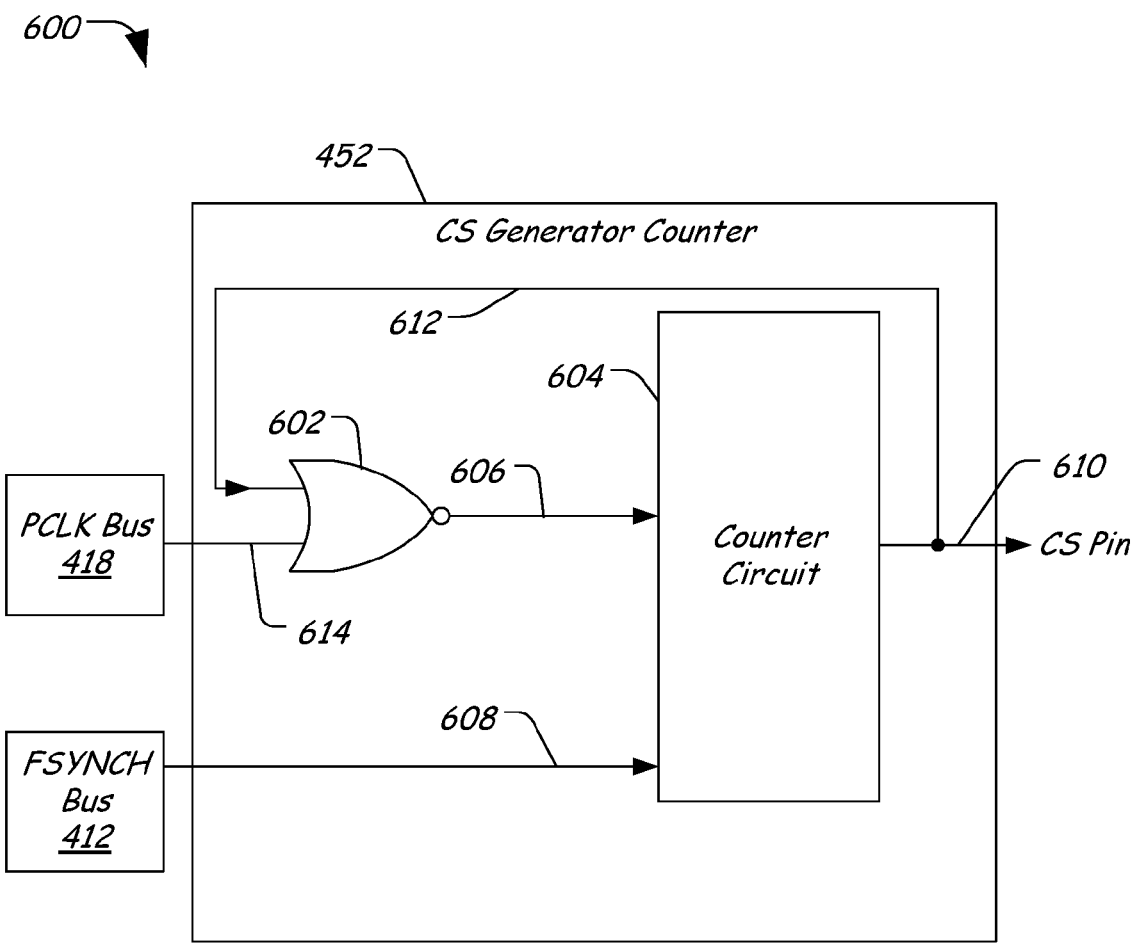
FIG. 6 is a diagram of a particular illustrative embodiment of a chip select circuit to produce a chip selection signal based on a PCM frame synchronization signal and a PCM clock signal received via isolated serial buses, where the chip selection signal is used to selectively activate portions of a circuit, such as the second circuits illustrated in FIGS. 2 and 4.
Figure 8:
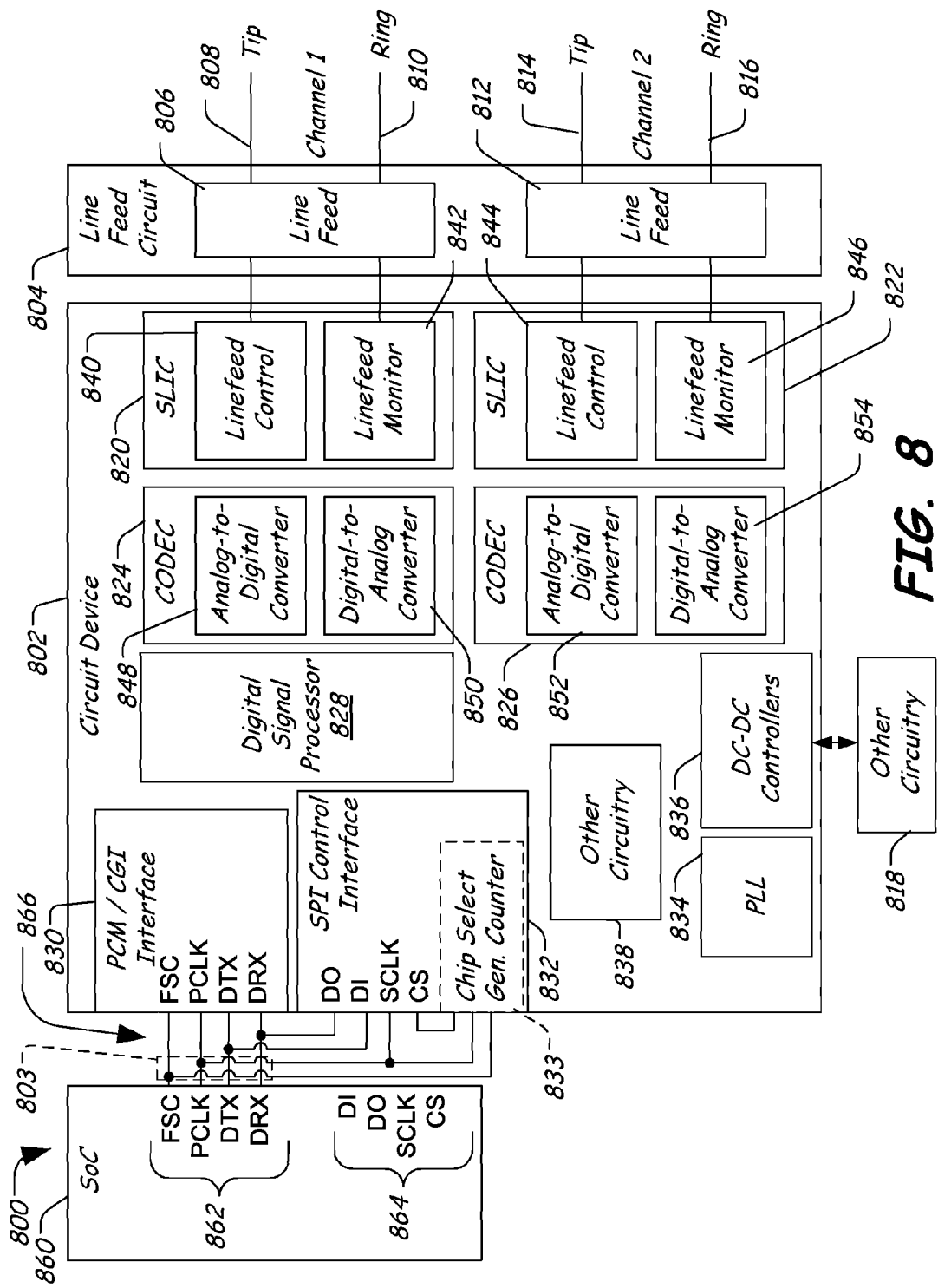
FIG. 8 is a block diagram of a particular illustrative embodiment of a portion of a communications device including a circuit device that is coupled to a system on a chip (SoC) via multiplexed serial buses.

FIG. 6 is a diagram of a particular illustrative embodiment of a chip select circuit 600 to selectively activate portions of a circuit, such as serial peripheral interface (SPI) circuits associated with a serial line interface circuit (SLIC), such as the SLIC circuit illustrated in FIG. 8. The chip select circuit 600 includes a chip select (CS) generator counter circuit 452, such as the CS generator counter circuit 452 illustrated in FIG. 4, which is adapted to receive a pulse code modulated (PCM) clock signal via a PCM terminal or bus 418 and to receive a PCM frame synchronization signal via a PCM frame synchronization terminal or bus 412.

The CS generator counter circuit 452 includes a logical NOR gate 602 having a gate output 606 that is coupled to a logic circuit 604, such as a counter circuit. The logic circuit 604 can be a low cost hardware counter, such as a five-bit counter, to generate a designated chip select time slot. The logic circuit 604 includes a frame synchronization input 608 coupled to the PCM frame synchronization bus 412. The logic circuit 604 further includes an output 610 that is coupled to a chip select pin or terminal, such as the chip select terminal 442 illustrated in FIG. 4. Further, the output 610 is coupled to a first input 612 of the logical NOR gate 602. The logical NOR gate 602 further includes a second input 614 that is coupled to the PCM clock bus or terminal 418.

In a particular embodiment, the logic circuit 604 can be a counter that is initialized by an edge (rising or falling edge) of the PCM frame synchronization signal received via the frame synchronization input 608 coupled to the PCM frame synchronization bus or terminal 412. Once initialized, the output 610 of the logic circuit 604 can be held at a logic low level until a number of PCM clock signals are counted. The output signal having a logic low level is applied to the first input 612 of the logical NOR gate 602, causing an inverted version of the PCM clock signal received via the second input 614 from the PCM clock bus or terminal 418 to be applied to the gate output 606. The logic circuit 604 can count the inverted PCM clock pulses until a pre-determined (or programmed) number of clock pulses are counted. Once the pre-determined (or programmed) number of clock pulses are counted, the logic circuit 604 can apply a logic high level to the output 610, which is also applied to the first input 612 of the logical NOR gate 602. In this instance, the PCM clock signal received via the second input 614 is negated by the NOR gate 602. The logic circuit 604 can continue to provide a logic high level at the output 610 until a next edge (rising or falling edge) of the PCM frame synchronization signal is received via the frame synchronization input 608.

Figure 7:
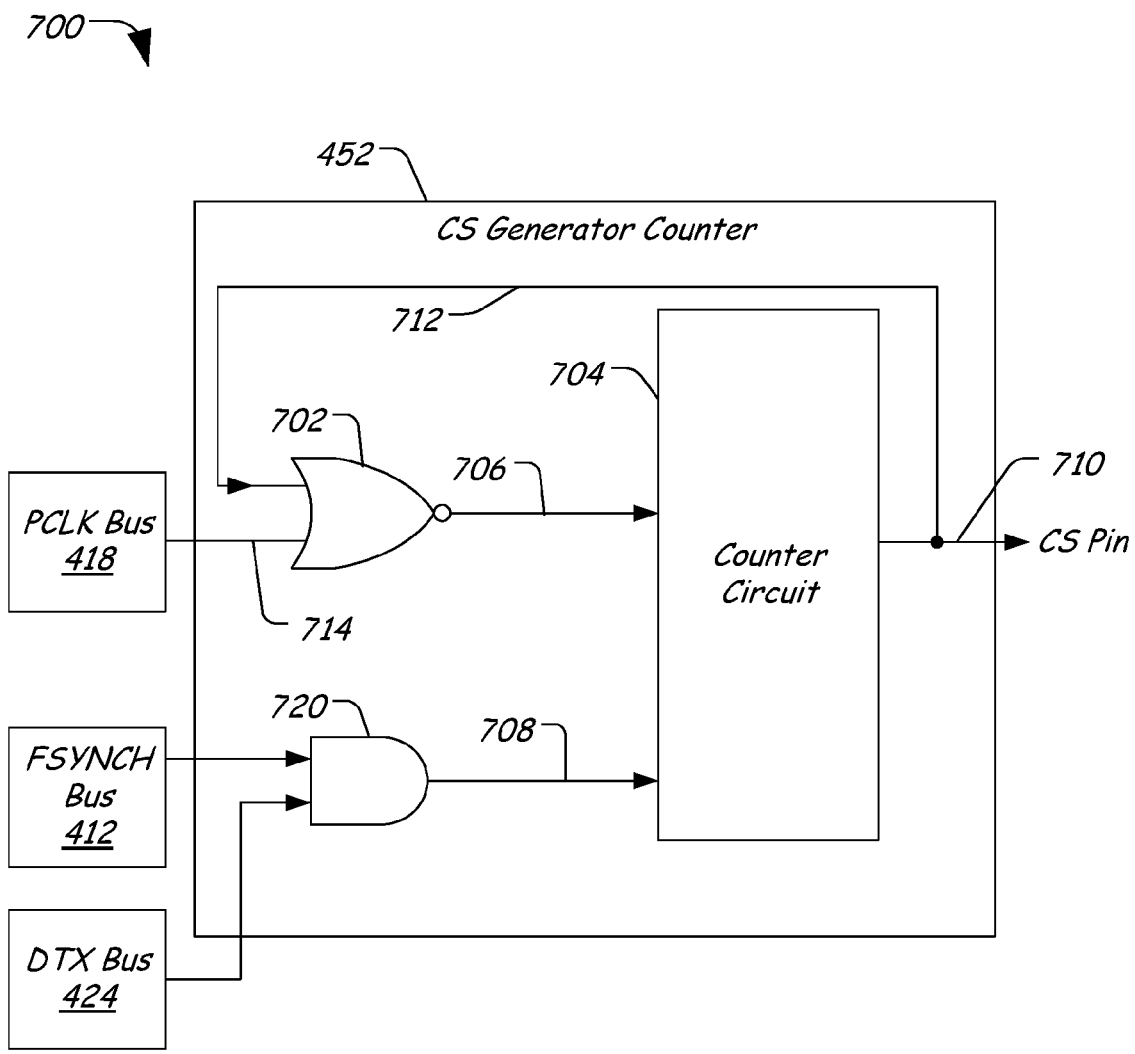
FIG. 7 is a block diagram of a second particular illustrative embodiment of a chip select circuit to produce a chip selection signal based on a data bit from a data transmit bus, where the chip selection signal is used to selectively activate portions of a circuit, such as the second circuits illustrated in FIGS. 2 and 4.

FIG. 7 is a block diagram of a second particular illustrative embodiment of a chip select circuit 700 to produce a chip selection signal based on a data bit from a data transmit bus, where the chip selection signal is used to selectively activate portions of a circuit, such as the second circuits illustrated in FIGS. 2 and 4 and serial peripheral interface (SPI) circuits associated with a serial line interface circuit (SLIC), such as the SLIC circuit illustrated in FIG. 8. The chip select circuit 700 includes a chip select (CS) generator counter circuit 452, such as the CS generator counter circuit 452 illustrated in FIG. 4, which is adapted to receive a pulse code modulated (PCM) clock signal via a PCM terminal or bus 418, a PCM frame synchronization signal via a PCM frame synchronization terminal or bus 412, and at least one bit of a data transmit signal received from the data transmit terminal or bus 424.

The CS generator counter circuit 452 includes a logical NOR gate 702 having a gate output 706 that is coupled to a logic circuit 704, such as a counter circuit. The logic circuit 704 can be a low cost hardware counter, such as a five-bit counter, to generate a designated chip select time slot. The logic circuit 704 includes an enable input 708 coupled to the PCM frame synchronization bus 412 via a logical AND gate 720. The logical AND gate 720 includes a first input coupled to the PCM frame synchronization bus 412 and a second input coupled to the data transmit (DTX) bus 424. Further, the logical AND gate 720 includes an output coupled to the enable input 708. The logic circuit 704 further includes an output 710 that is coupled to a chip select pin or terminal, such as the chip select terminal 442 illustrated in FIG. 4. Further, the output 710 is coupled to a first input 712 of the logical NOR gate 702. The logical NOR gate 702 further includes a second input 714 that is coupled to the PCM clock bus or terminal 418.

In a particular embodiment, the logic circuit 704 can be a counter that is enabled by an edge (rising or falling edge) of the output of the logical AND gate 720 received via the enable input 708 coupled to the PCM frame synchronization bus or terminal 412 and to the data transmit bus or terminal 424. In a particular embodiment, a data bit, such as bit zero (bit0) of the data transmit signal, may be used to signal when serial peripheral interface (SPI) data is to be communicated between circuits. In this particular example, when the data bit has a value of zero, no SPI data is communicated via the PCM bus, and when the data bit has a value of one, the SPI data is communicated via the PCM bus. In this particular embodiment, SPI communications can be signaled or controlled based on a value of a particular data bit within the data transmit (DTX) payload. In this instance, the circuits communicate SPI data only when the particular bit is set, and the "No-Op" command described with respect to FIG. 5 can be omitted.

FIG. 8 is a block diagram of a particular illustrative embodiment of a portion of a communications device 800 including a circuit device 802 that is coupled to a system on a chip (SoC) 860 via multiplexed, serial buses 866 and shared isolation circuitry 803. In a particular embodiment, the circuit device 802 can be a low-voltage integrated circuit adapted to couple to a high voltage line feed integrated circuit 804. In a particular example, the line feed circuit 804 includes a first line feed circuit 806 that is coupled to a first channel (channel 1) having a first tip line 808 and a first ring line 810 and includes a second line feed circuit 812 that is coupled to a second channel (channel 2) having a second tip line 814 and a second ring line 816. In this particular example, the line feed circuit 804 is adapted to connect to two different phone lines. In a particular embodiment, the circuit device 802 can operate as a subscriber line interface circuit (SLIC) including coder-decoder (CODEC) functionality, dual tone multi-frequency (DTMF) detection, and signal generation functions used for two complete analog telephone interfaces, including battery, over-voltage, ringing, supervision, CODEC, hybrid, and test functions (such as metallic loop testing capabilities).

The circuit device 802 includes a first SLIC circuit 820 and a second SLIC circuit 822 that are coupled to the first and second line feed circuits 806 and 812, respectively. The first SLIC circuit 820 can include a first line feed control circuit 840 and a first line feed monitor circuit 842, which are coupled to the first line feed circuit 806 to control and monitor the first line feed circuit 806. The second SLIC circuit 822 can include a second line feed control circuit 844 and a second line feed monitor circuit 846, which are coupled to the second line feed circuit 812 to control and monitor the second line feed circuit 812. The circuit device 802 further includes first and second CODEC circuits 824 and 826, which are coupled to the first and second SLIC circuits 820 and 822, respectively. The first CODEC circuit 824 can include a first analog-to-digital converter (ADC) 848 and a first digital-to-analog converter (DAC) 850. The second CODEC circuit 826 includes a second ADC 852 and a second DAC 854. The first and second CODEC circuits 824 and 826 can provide standard voice-band (e.g., 200 Hz to 3.4 kHz) audio processing capabilities, including both wideband (50 Hz to 8 kHz) and standard voice-band (200 Hz to 3.4 kHz) operating modes. The wide band mode can provide an expanded audio band with a 16 kHz sample rate for enhanced audio quality while the standard voice-band mode provides telephony audio compatibility.

The circuit device 802 further includes a digital signal processor 828 that can be used to process received digital samples. Additionally, the circuit device 802 includes pulse code modulated (PCM)/common gateway interface (CGI) interface circuitry 830 that is adapted to communicate with the SoC 860. The circuit device 802 further includes a serial peripheral interface (SPI) control interface circuit 832, which may include a chip select (CS) generator counter 833 (such as the chip select generator counter circuit 452 illustrated in FIG. 4). While the CS generator counter 833 is illustrated as being included within the circuit device 802, it should be understood that, in another embodiment, the CS generator counter 833 can be external to the circuit device 802. Further, the CS generator counter 833 can be programmable via register settings.

The circuit device 802 further includes a phase locked loop (PLL) circuit 834 to synchronizing timing. The circuit device 802 can include one or more direct current (DC)-to-DC controllers 836, which may communicate with a bill of materials 818 (e.g., additional circuitry). The circuit device 802 can also include other circuitry 838, such as a general purpose processor, encryption/decryption circuitry, other circuits, or any combination thereof.

In a particular embodiment, the first and second line feed circuits 806 and 812 provide programmable on-hook loop voltage, off-hook loop current, reverse battery operation, loop or ground start operation, and on-hook transmission functionality, which may be controlled and monitored via the first and second line feed control and monitor circuits 840, 842, 844, and 846. The loop current and voltage can be monitored using the ADCs 848 and 852 of the CODECs 824 and 826.

Further, the circuit device 802 integrates complete audio transmit and receive paths, including alternating current (AC) impedance and hybrid gain. In a particular example, the audio transmit and receive paths can be software-programmable, allowing the circuit device 802 to be utilized with multiple different requirements. For example, the digital signal processor 828 can be used to calculate coefficients to match the output impedance of the first and second SLIC circuits 820 and 822 to reduce signal reflections. Further, the digital signal processor 828 can implement a hybrid balance function to cancel reflected receive path signals from the transmit path using coefficient generator software to determine adjustable filter coefficients. Digital voice data transfers can be sent to the SoC 860 via the PCM/CGI interface 830, and control data can be transferred using the SPI control interface 832.

In a particular embodiment, the SPI control interface 832 can be a four-wire interface modeled after microcontroller and serial peripheral devices. The SPI control interface 832 includes an SPI clock terminal or pin (SCLK), an SPI chip select terminal or pin (CS), an SPI serial data input (SDI), and an SPI serial data output (SDO). The PCM/CGI interface 830 includes a flexible, programmable interface for the transmission and reception of digital PCM samples. PCM data transfer can be controlled by a PCM clock signal and a PCM frame synchronization signal received at a PCM clock terminal or pin (PCLK) and at a PCM frame synchronization pin or terminal (FSC), respectively. The PCM/CGI interface 830 includes PCM mode select, PCM transmit start, and PCM receive start settings, which allow for programming of the PCM/CGI interface 830 for various operating modes. Additionally, the PCM/CGI interface 830 includes a PCM data transmit (DTX) terminal (or pin) and a PCM data receive (DRX) terminal (or pin). In a particular embodiment, the PCM/CGI interface 830 can be configured to support from four to 128 8-bit time slots in each 125 µs frame, corresponding to a PCM clock frequency range of 256 kHz to 8.192 MHz.

In a particular embodiment, the circuit device 802 is adapted to communicate voice data and corresponding frame synchronization and PCM clock signals via the DTX, DRX, FSC, and PCLK terminals and via the isolation circuitry 803 to corresponding DTX, DRX, FSC, and PCLK terminals 862 of the SoC 860. Further, the circuit device 802 is adapted to utilize a chip select signal from the chip select generator counter 833 to selectively activate the SPI control interface 832 to communicate control data via the PCM DTX and DRX terminals and via the isolation circuitry 803 to the SoC 860.

In a particular example, the isolate circuitry 803 can include multiple isolation circuits, which can be shared by the serial buses 866 to send both control and voice data over the same serial buses at different times or points within the PCM frame, as shown with respect to the diagrams 300 and 500 illustrated in FIGS. 3 and 5, which times or points may correspond to particular pulses of an SPI clock or a PCM clock. Further, by multiplexing the SPI control data onto the PCM data lines (DTX and DRX) and by utilizing the PCM clock and the frame synchronization signals to control chip selection, at least four isolation circuits can be eliminated. Further, SPI control pins 864 of the SoC 860 can be repurposed to communicate with other circuitry or can be eliminated. Additionally, the CS generator counter 833 can use a low-cost hardware counter, such as a five-bit counter, to generate a SPI time slot for transmission of SPI control data.

While the above-example relates to a communications device, it should be understood that other types of electronic devices and other types of circuits may utilize serial data transmission protocols. By using a frame synchronization signal to multiplex serial data from two different serial interface circuits onto the same serial lines, the number of isolation circuits can be reduced, reducing overall costs. Further, by eliminating some of the isolation circuits (without sacrificing electrical isolation), pins of one of the circuits (such as the SoC 860 in FIG. 8) can be repurposed for other functions or eliminated. Additionally, by reducing the number of isolation circuits, the overall circuit area can be reduced.

Figure 9:
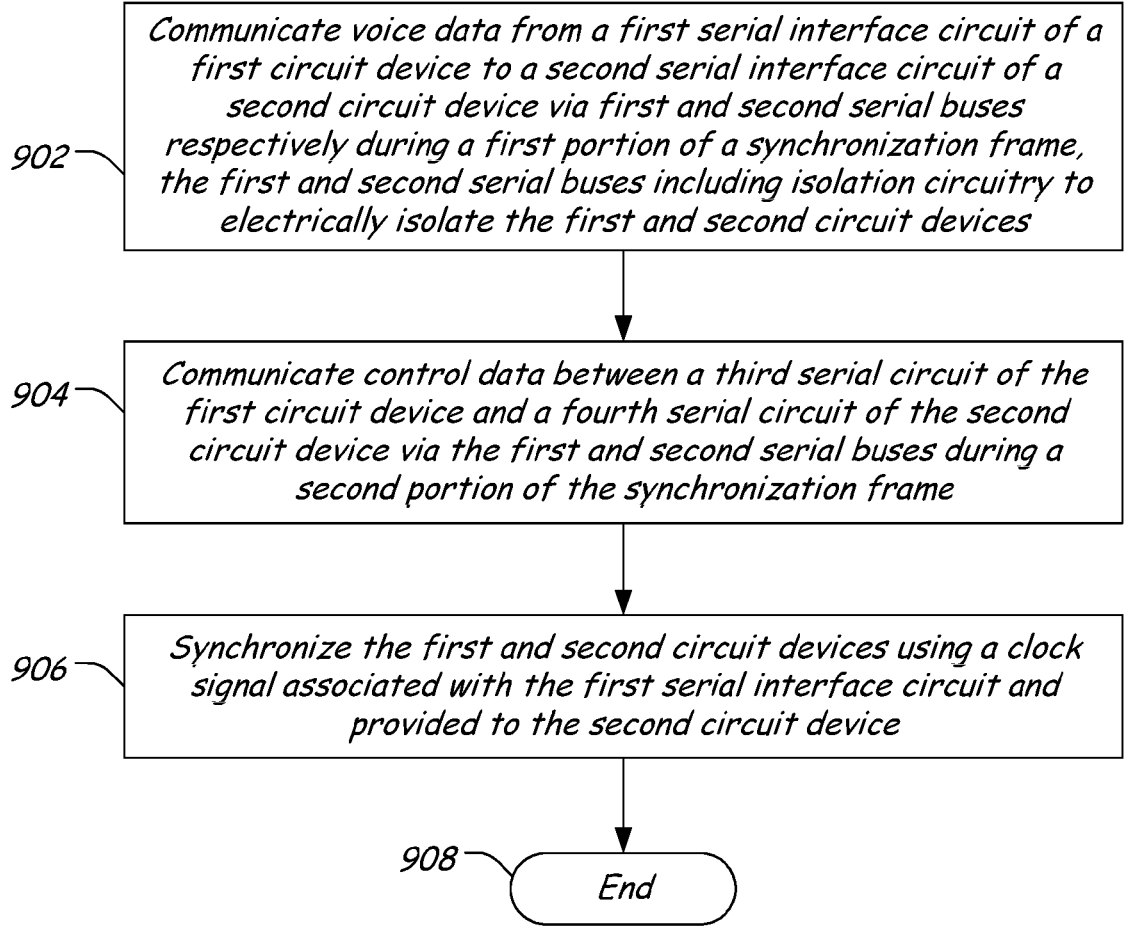
FIG. 9 is a flow diagram of a particular illustrative embodiment of a method of communicating serial data between two circuit devices using multiplexed selected serial buses with shared serial bus isolation.

FIG. 9 is a flow diagram of a particular illustrative embodiment of a method of multiplexing selected serial buses to communicate serial data between two circuit devices. At 902, voice data is communicated from a first pulse code modulated (PCM) interface circuit of a first circuit device to a second PCM circuit of a second circuit device via first and second serial buses respectively during a first portion of a PCM synchronization frame, where the first and second serial buses include isolation circuitry to electrically isolate the first and second circuit devices. In a particular embodiment, the first circuit device can include multiple serial bus terminals, including a frame synchronization terminal and a clock terminal, which may be used to synchronize and perform chip selection for communicating different types of serial data from different circuits within configured slots of a PCM frame. Continuing to 904, control data is communicate between a first serial peripheral interface (SPI) circuit of the first circuit device and a second SPI circuit of the second circuit device via the first and second serial buses during a second portion of the synchronization frame. Advancing to 906, the first and second circuit devices are synchronized using at least one clock signal associated with the first serial interface circuit and provided to the second circuit device. The method terminates at 908.

In a particular embodiment, the at least one clock signal includes a PCM clock signal and an SPI clock signal, which are transmitted from the first circuit device to the second circuit device via clock serial buses that include isolation circuitry to electrically isolate the first and second circuit devices. In another particular embodiment, the PCM clock signal is utilized for both the PCM clock and the SPI clock. In a particular embodiment, a PCM frame synchronization signal is used for frame synchronization and for chip selection of the second SPI circuit.

In conjunction with the circuit devices and methods disclosed above with respect to FIGS. 2-9, a circuit device is disclosed that is adapted to communicate serial data between two circuit devices via shared isolation circuitry. In a particular example, the first and second circuit devices may each include a pulse code modulated (PCM) circuit and a serial peripheral interface (SPI) circuit, and the PCM and SPI circuits can communicate via a shared pair of serial buses. In a particular example, the total number of external serial buses for a circuit device can be reduced, reducing the customer costs for bus isolation. In particular, the number of bus signals (isolated buses) is reduced by multiplexing the PCM and SPI buses, using the frame synchronization signal to multiplex the SPI and PCM buses. In a particular example, the frame synchronization signal and the PCM clock signal can be used in combination to produce a chip selection signal that can be used to selectively activate at least one of the circuits for communicating data.

It should be understood that, while the above-examples and embodiments have been directed to circuits that include PCM circuitry and SPI circuitry and that communicate PCM and SPI data, the circuit devices can be used with any circuitry that uses serial data communication protocols. Further, though the primary example has been described with respect to a telephonic communication system (such as the circuit device of FIG. 8), the serial data multiplexing arrangement can be utilized with other types of circuits and with other types of serial data.

Although the present invention has been described with reference to preferred embodiments, workers skilled in the art will recognize that changes may be made in form and detail without departing from the spirit and scope of the invention.

What is claimed is:

1. A circuit device comprising:
a first circuit comprising a first plurality of serial terminals including a first data receive terminal and a first data transmit terminal, the first plurality of serial terminals communicatively coupled to a particular circuit via isolation circuitry to communicate first serial data, the first circuit includes a frame synchronization terminal to receive a frame synchronization signal from the particular circuit via a frame synchronization isolation circuit; and
a second circuit comprising a second plurality of serial terminals including a second data receive terminal coupled to the first data transmit terminal and including a second data transmit terminal coupled to the first data receive terminal to communicate second serial data to the particular circuit via the first data receive and transmit terminals, the second circuit includes a chip selection terminal coupled to the frame synchronization terminal to receive frame synchronization signal from the particular circuit via the frame synchronization isolation circuit wherein the second circuit is selectively activated based on a logic level associated with the frame synchronization signal.

2. The circuit device of claim 1, wherein the circuit device comprises a subscriber line interface circuit, wherein the first circuit comprises a pulse code modulated (PCM) circuit, and wherein the second circuit comprises a serial peripheral interface (SPI) circuit.

3. The circuit device of claim 1, wherein the first circuit is adapted to transfer the first serial data via the first data receive and transmit terminals during a first portion of the frame synchronization signal, and wherein the second circuit is adapted to transfer the second serial data during a second portion of the frame synchronization signal.

4. The circuit device of claim 1, further comprising:
a logical AND gate including a first terminal coupled to the frame synchronization terminal, a second terminal coupled to the data transmit terminal; and
an output coupled to a chip select input of the second circuit;
wherein the second circuit is enabled based on a value of a particular bit of a data transmit signal and based on the frame synchronization signal.

5. The circuit device of claim 1, wherein the first circuit includes a first clock terminal to receive a first clock signal from the particular circuit via the isolation circuitry, and wherein the second circuit includes a second clock terminal coupled to the first clock terminal to receive the first clock signal.

6. The circuit device or claim 5, wherein the first circuit further comprises:
a first frame synchronization terminal to receive a first frame synchronization signal from the particular circuit via the isolation circuitry; and
wherein the second circuit further comprises a chip select terminal to receive a chip selection signal to selectively activate the second circuit to send and receive data via the first transmit and receive data terminals.

7. The circuit device of claim 6, wherein the first circuit communicates the first serial data via the first data transmit and receive terminals during a first portion of the frame synchronization signal and the second circuit communicates the second serial data via the first data transmit and receive terminals during a second portion of the frame synchronization signal.

8. The circuit device of claim 7, wherein the a chip select terminal is coupled to the frame synchronization terminal, the chip select terminal responsive to the PCM frame synchronization signal to selectively enable the second circuit to send and receive the second serial data via the first data transmit and receive terminals when the first circuit is not sending and receiving the first serial data.

9. The circuit device of claim 7, further comprising:
a chip select generator comprising:
a first input coupled to the frame synchronization terminal to receive the frame synchronization signal;
a second input coupled to the a first clock terminal to receive a first clock signal;
an output coupled to the chip select terminal of the second circuit to provide the chip selection signal; and
logic responsive to the frame synchronization and clock signals to selectively output the chip selection signal.

10. A subscriber line interface circuit (SLIC) device comprising:
a pulse code modulation (PCM) circuit adapted to communicate voice data to a system, the PCM circuit comprising:
a PCM frame synchronization terminal to receive a PCM frame synchronization signal from the system via a first isolated serial bus;
a PCM clock terminal to receive a PCM clock signal from the system via a second isolated serial bus;
a PCM data transmit terminal to transmit PCM data signals to the system via a third isolated serial bus;
a PCM data receive terminal to receive PCM data signals from the system via a fourth isolated serial bus;
a serial peripheral interface (SPI) circuit adapted to communicate control data to the system via the third and fourth isolated serial buses, the SPI circuit comprising:
an SPI chip select terminal to receive an SPI chip enable signal to selectively activate the SPI circuit;
an SPI data output terminal coupled to the fourth isolated serial bus; and
an SPI data input terminal coupled to the third isolated serial bus; and
a chip select venerator counter circuit comprising:
a first input coupled to the PCM frame synchronization terminal:,
a second input coupled to the PCM clock terminal;
an output coupled to the SPI chip select terminal; and
a logic circuit responsive to the PCM frame synchronization signal and the PCM clock signal to produce the SPI chip enable signal.

11. The SLIC device of claim 10, wherein the SPI circuit further includes an SPI clock terminal coupled to the PCM clock terminal to receive the PCM clock signal.

12. The SLIC device of claim 10, wherein the logic circuit comprises:
a counter circuit comprising:
a reset input coupled to the first input to receive the PCM frame synchronization signal and to reset the counter circuit in response to the PCM frame synchronization signal;
a clock input; and
a chip select output coupled to the SP1 chip select terminal; and
a logic gate comprising: a first gate input coupled to the second input to receive the PCM clock signal;
a second gate input coupled to the chip select output; and
a logic gate output coupled to the clock input.

13. The SLIC device of claim 10, wherein the system comprises a system on a chip (SoC) circuit device.

14. The SLIC device of claim 10, wherein the SPI circuit includes an SPI clock terminal coupled to a second SPI clock terminal of the system via an SPI clock isolation circuit.

15. The SLIC device of claim 14, wherein the SPI clock isolation circuit comprises an optical isolation circuit.

16. A circuit device comprising:
a first circuit including a first plurality of terminals adapted to couple to a respective plurality of serial buses to communicate first serial data via isolation circuitry to a system, the first plurality of terminals comprising:
a first serial data transmit terminal adapted to couple to a first data bus of the respective plurality of data buses;
a first serial data receive terminal adapted to couple to a second data bus of the respective plurality of data buses;
a first synchronization terminal adapted to couple to a first synchronization bus of the respective plurality of data buses; and
a second circuit to selectively communicate second serial data via the first serial data receive and transmit terminals in response to receiving the chip select signal, the second circuit comprising:

a second data receive terminal coupled to the first serial data transmit terminal;

a second data transmit terminal coupled to the first serial data receive terminal; and a chip select terminal to receive a chip select signal to enable the second circuit to communicate the second serial data to the system, the chip select terminal is coupled to the first synchronization bus of the first circuit to receive a frame synchronization signal and to selectively activate the second circuit during a portion of the frame synchronization signal.

17. The circuit device of claim 16, wherein the first circuit comprises:

a clock terminal to receive a clock signal via the isolation circuitry; and a chip select (CS) generator comprising:

a first CS input coupled to the frame synchronization terminal;

a second CS input coupled to the clock terminal;

a CS output coupled to the chip select terminal of the second circuit to provide the chip select signal based on the frame synchronization signal and the clock signal.

18. The circuit device of claim 16, wherein the first circuit comprises a pulse code modulated (PCM) circuit adapted to communicate PCM voice data samples, wherein the second circuit comprises a serial peripheral interface (SPI) circuit adapted to communicate control data, and wherein the circuit device is associated with a communications device that is adapted to communicate voice data via a network.

* * * * *